D. HUNSICKER.
Pump for Drawing and Measuring Molasses.
No. 4,409.  Patented March 7, 1846.
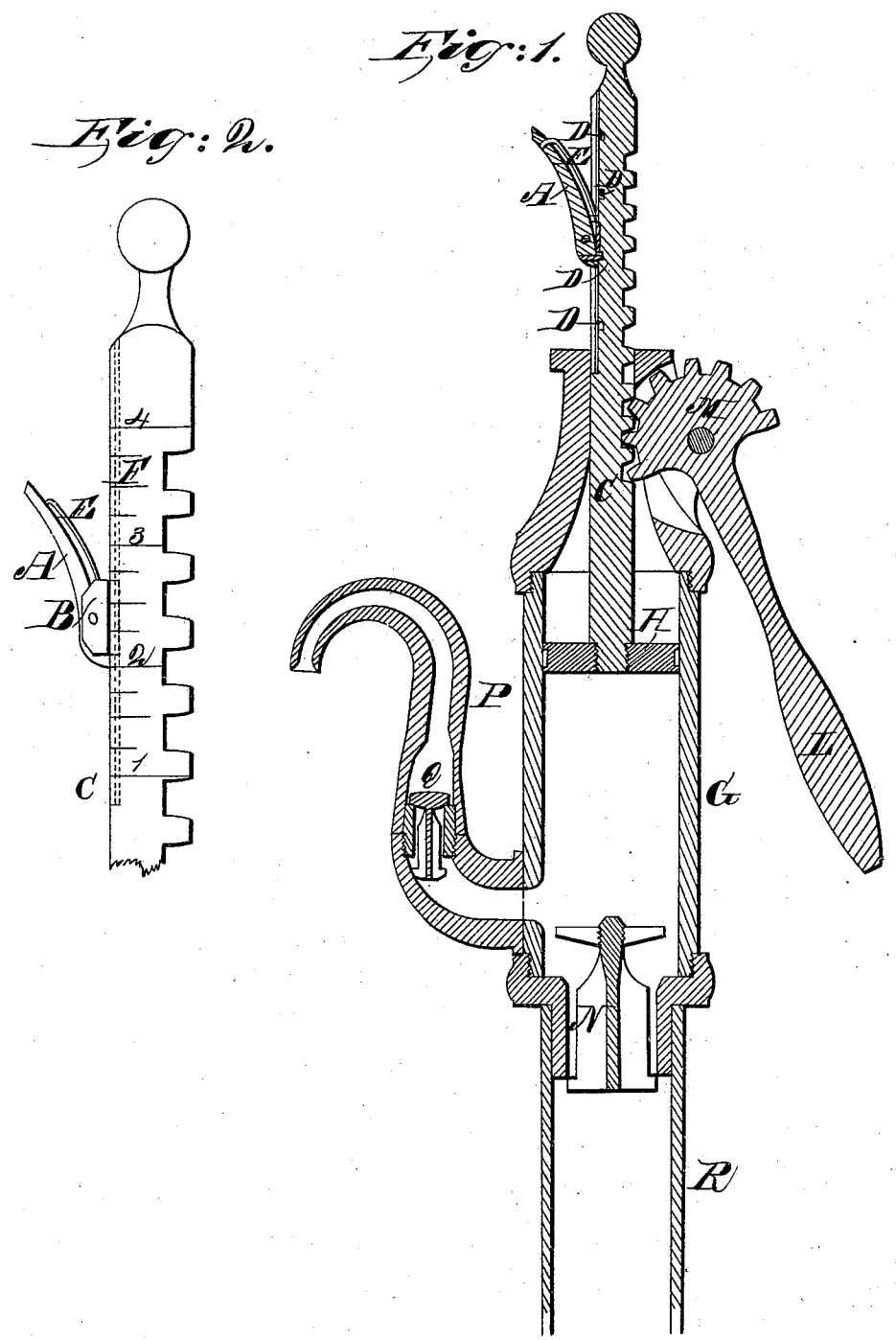

UNITED STATES PATENT OFFICE.

DANIEL HUNSICKER, OF HARTLETON, PENNSYLVANIA.

PUMP FOR RAISING AND MEASURING LIQUORS.

Specification of Letters Patent No. 4,409, dated March 7, 1846.

*To all whom it may concern:*

Be it known that I, DANIEL HUNSICKER, of Hartleton, in the county of Union and State of Pennsylvania, have invented a new and useful apparatus for drawing molasses, oil, and other articles in any given measure by atmospheric pressure and lever-power combined, which is described as follows, reference being had to the annexed drawings of the same, making part of this specification.

Figure 1 is a vertical section of the apparatus. Fig. 2 is an elevation of the upper part of the rack piston showing the scale thereon.

My invention and improvement consist in combining with a suction and force pump and adjustable gage and scale by which any required quantity say a quart, pint, half pint, gill, half gill &c. may be raised from the hogshead placed not over 32 feet below the apparatus by simply depressing and elevating a handle or lever having a segment cog wheel working into a rack on the piston rod. The scale is to be marked on the piston rod above the cylinder. It is adjusted for the several kinds of measures by trials with standard measures and marked on the rod. The stop gage A that corresponds with the scale for determining the descent of the piston and consequently the size of the vacuum to be filled with molasses by atmospheric pressure corresponding with the scale, consists of a combination of a sliding block B having dovetailed edges corresponding with and fitting into dovetailed grooves formed in the piston rod C in which it is made to slide vertically and a stop lever or gage A turning on an axle in ears on said slide and made to enter depressions D in the piston rod corresponding with the scale of measures by means of a spring E placed behind the lever which throws it into the said depressions. This stop strikes against the head of the cylinder and arrests the descent of the piston at the degree required—corresponding with the measure desired—which is indicated on the scale F.

The main body of the apparatus such as the cylinder G piston H rod C lever L and segment cog wheels M puppet valve N spout P with its valve Q and the tube R leading to the vessel containing the article to be drawn placed in the cellar, or other place may be made in the most approved manner of such articles. The apparatus is designed to be placed in the counter, or other convenient place in the shop.

I make no claim to the pump but only to—

The combination of the additional apparatus with it by which it is adapted to the drawing of molasses, oil and other articles in any required measure by atmospheric pressure and lever power P—that is to say the scale F stop lever A, slide B and spring E.

DANIEL HUNSICKER.

Witnesses:
  WM. P. ELLIOT,
  A. E. H. JOHNSON.